US006250513B1

(12) United States Patent
Haas

(10) Patent No.: US 6,250,513 B1
(45) Date of Patent: Jun. 26, 2001

(54) DEVICE FOR METERING A POWDER

(75) Inventor: Reiner Haas, Metzingen (DE)

(73) Assignee: Weitmann & Konrad GmbH & Co. KG, Leinfelden-Echterdingden (DE)

( * ) Notice: Subject to any disclaimer, the term of this patent is extended or adjusted under 35 U.S.C. 154(b) by 0 days.

(21) Appl. No.: 09/369,348

(22) Filed: Aug. 6, 1999

(30) Foreign Application Priority Data

Aug. 10, 1998 (DE) .............................................. 198 36 014

(51) Int. Cl.[7] ...................................................... G01F 11/24

(52) U.S. Cl. ............................................... 222/414; 222/63

(58) Field of Search .................................... 222/410, 414, 222/63, 111; 239/3

(56) References Cited

U.S. PATENT DOCUMENTS 3,680,779 * 8/1972 Reilly ........................................ 239/3
3,760,990 * 9/1973 Lindquist ............................. 222/371
4,154,370 * 5/1979 Mowbray et al. ...................... 406/70
4,531,839 * 7/1985 Cunisse et al. ....................... 366/110
5,615,830 * 4/1997 Matsunaga et al. ..................... 239/8

FOREIGN PATENT DOCUMENTS 327747 3/1958 (DE) .
1 820 842 9/1960 (DE) .
37 39 968 A1 7/1988 (DE) .
2583377 * 12/1986 (FR) .

OTHER PUBLICATIONS

Patent Abstracts of Japan, "Powder Spray Device for Prevention of Ink Seepage Into Rear Side on Printer", 2–76738, Mar. 16, 1990, M–982, Jun. 8, 1990, vol. 14/No. 266.

* cited by examiner

*Primary Examiner*—Daniel J. Colilla
(74) *Attorney, Agent, or Firm*—Jones, Tullar & Cooper, P.C.

(57) ABSTRACT

The present invention relates to a device for metering a powder, having a device for the delivery of powder, a axially symmetrical metering element arranged underneath the delivery device, and a drive for the axially symmetrical metering element, wherein the axially metering symmetrical element has a surface profile extending in the circumferential direction, and is adapted in its configuration so that the powder is not compressed during movement about the axially symmetrical metering element.

16 Claims, 1 Drawing Sheet

DEVICE FOR METERING A POWDER

FIELD OF THE INVENTION

The present invention relates to a device for metering a powder, in particular for a dusting device for dusting printed sheets of paper, having a device for delivering the powder, an axially symmetrical metering element arranged underneath the delivery device, and a drive for the metering element.

BACKGROUND OF THE INVENTION

A print dusting installation in printing presses for dusting printed sheets with powder is known from German Patent DE 18 20 842 U1. This installation has a funnel tube for the powder, which terminates on a metering roller. The metering roller has metering chambers constituted by grooves extending in the longitudinal direction. An amount of powder is specifically transported out of the funnel via these metering chambers and conducted into an air conduit. There, the powder in the metering chambers is delivered.

In connection with these metering chambers it is considered to be disadvantageous that the powder is held in the metering chambers by means of an interlock, so that the powder must be actively removed from the metering chambers. Since the metering chambers extend transversely with respect to the conveying direction, there is the danger that the powder is compressed in these metering chambers and cakes there.

A roller is known from U.S. Pat. No. 4,867,063, which is provided with cells on its surface. Although it is possible to transport bulk material in a simple manner by means of this cell conveyor, when transporting powder the problem arises that the cells slowly become clogged, so that the transported volume is reduced over time. Thus, with such cell conveyors there is no assurance of a constant volume transport over an extended period of time.

SUMMARY OF THE INVENTION

The object of the present invention is therefore based on designing a device for metering a powder of the type mentioned at the outset in such a way, that the powder can be removed relatively simply from the metering element, and that there is no danger of the powder being compressed inside the metering chambers.

In accordance with the present invention this object is attained by means of a device of the type mentioned at the outset in that the metering element has a surface profile extending in the circumferential direction.

The fact, that the metering chambers extend in the circumferential direction of the metering element and therefore in the transport direction, prevents the powder from being compressed in the metering chambers. Moreover, the powder contained in the storage container is hardly affected, in particular no compressions or clumps are being created. Furthermore, the powder, which is located in the surface profile extending in the circumferential direction, can be delivered relatively easily out of this profile, because the powder lies relatively loosely in this profile.

A further development provides that the surface profile is embodied in the form of circumferential channels, circumferential grooves, circumferential corrugations, or the like. A surface profile designed in this way has the considerable advantage that the surface of the roller receiving the powder is enlarged by the engraving, so that the adhesive forces by means of which the powder is maintained on the roller are considerably greater than those of metering elements with a smooth surface. In this case the powder adheres so well to the roller which, for example, has been provided with channels, that it does not fall out of the channels even under the action of gravity. The surface profile has a preferred depth between 0.2 mm and 0.8 mm.

In accordance with the present invention an increase in the adhesive force is achieved in that the surface of the metering element is made powder-friendly. Thus, the surface can be roughened, sand-blasted, etched, chromated or electrolytically provided with a matte finish. These surfaces receive the powder particularly well and optimally transport it in the direction of the delivery opening, so that it is assured that a constant amount of powder is always delivered.

A further possibility of surface treatment provides that calcium carbonate or powder is glued to the surface of the metering element A roughening of the surface, which essentially corresponds to the grain size of the powder to be transported, is also achieved in this way.

A preferred embodiment provides that the metering element is designed as a metering roller. However, it is also conceivable to design the metering element as a cone or a sphere with a horizontal shaft. The powder is applied to the metering element in the area of an upper section and is removed from the metering element in a lower section.

Removal of the powder is assured by the present invention in that the metering element is provided with a device for loosening the powder from the metering element. This loosening device essentially operates in the circumferential direction or tangentially with respect to the circumferential direction. Here, the device can be a doctor blade, a brush or a blower nozzle. Such a device can enter into the surface profile of the roller, which extends in the circumferential direction, in a relatively simple manner and loosen the powder. This is not possible with cell conveyors of the above mentioned type since it is not possible, for example, to enter the individual cells with a doctor blade.

The drive for the metering element preferably is a step motor. In this connection it is provided in a further development that the drive, and in particular the entire device, is resiliently seated. The device is made to vibrate by the step motor, so that the flow of the powder is aided by this. Because of this it is possible to omit stirrers or the like.

In order to prevent the powder from flowing out of the storage container, the metering element has an outlet opening which, viewed in the direction of rotation, is offset by more than 180° with respect to the inlet opening. In this way the powder is prevented from directly entering the inlet opening via the surface profile of the metering element to the outlet opening, and from being mixed there in an uncontrolled manner with the air flow. The non-conveying area of the metering element is sealed, for example by means of a doctor blade.

In connection with a further development it is provided that the metering zone is laterally bordered by labyrinth seals. These labyrinth seals can be emptied via a drain. Labyrinth seals have the essential advantage that they can be produced relatively simply and do not require maintenance. Furthermore, a slide ring seal is provided between the drive and the metering element, which protects the drive against penetration by powder.

Further advantages, characteristics and details of the present invention ensue from the following description, in which a particularly preferred exemplary embodiment is described in detail, making reference to the drawings. Here, the characteristics represented in the drawings and mentioned in the specification as well as in the claims can be important for the present invention, either respectively by themselves or in any arbitrary combination.

DETAILED DESCRIPTION OF THE PREFERRED EMBODIMENT

Figure 1:
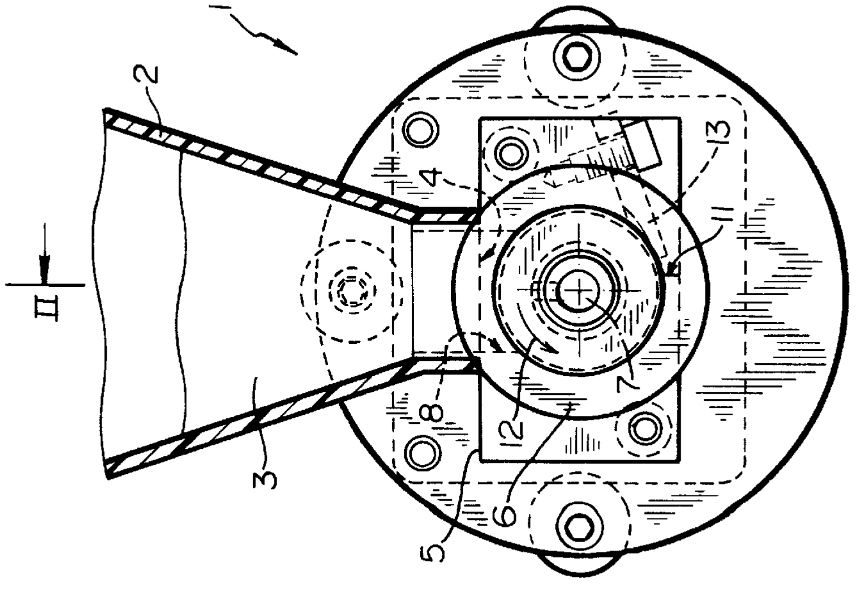
FIG. 1, is a longitudinal section through a metering element of a dusting device.

In FIG. 1 is a metering element is identified by the reference numeral 1, which has a funnel used as a storage container 2, in which powder 3 is stored. The storage container 2 has an outlet opening 4, which is seated on a roller housing 5. A metering roller 6 is arranged in this roller housing 5 and is seated, rotatable around a horizontal shaft 7. This metering roller 6 has an essentially cylindrical shape and is located, almost free of play, in an appropriate bore in the roller housing 5. The outlet opening 4 terminates in an inlet opening 8 provided in the upper area of the roller housing 5, through which the powder 3 stored in the storage container 2 can enter the roller housing 5.

Figure 2:
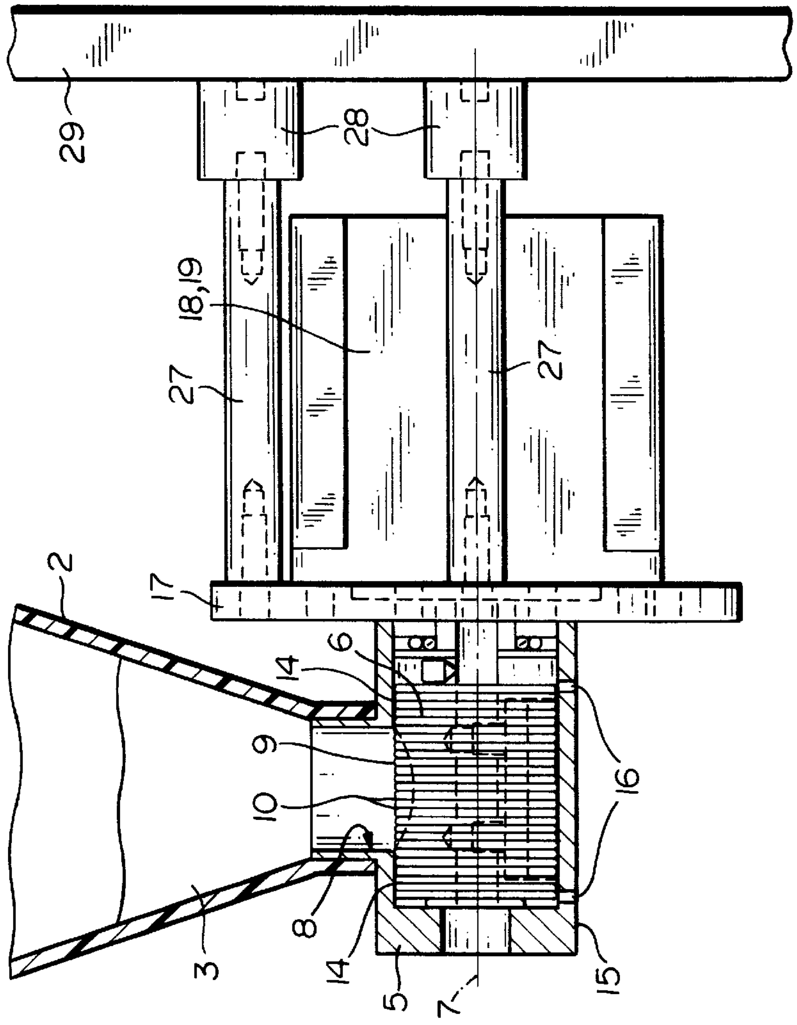
FIG. 2, is a section along taken the line II—II in FIG. 1.

In FIG. 2 it can be seen that the inlet opening 8 terminates directly on the surface 9 of the roller 6. The surface 9 of the metering roller 6 is provided with a multitude of channels, which are axially symmetrical in the circumferential direction and extend past the inlet opening 8 on both sides of the metering roller 6. No powder gets into the channels 10 in this area, so that the grooves act as a labyrinth seal 14 there. The powder is transported by means of the channels 10 in the direction toward an outlet opening 11, which is not located directly underneath the inlet opening 8, but is offset by more than 180° in the direction of rotation (arrow 12) with respect to the inlet opening 8. A doctor blade 13 is furthermore located in this outlet opening 11, which enters into the channels 10 of the metering roller 6 and by means of which the powder 3 in the channels 10 is lifted out, so that it can fall over the outlet opening 11 downward out of the roller housing 5 into a catch funnel. The doctor blade 13 assures that the channels 10 are completely emptied and are again available for receiving powder 3 at the inlet opening 8.

It can additionally be seen in FIG. 2 that two bores 16 are provided on the underside 15 of the roller housing 5 in the area of the front ends of the metering roller 6, through which powder which enters the labyrinth seal 14 can be removed into the catch funnel, so that it cannot reach the bearings of the shaft 7.

It can furthermore be seen in FIG. 2, that the metering roller 6 is overhung, wherein a step motor 19 used as the drive 18 is located on the one side of a holding bracket 17, and on the other side of the holding bracket 17 the roller housing 5 with the metering roller 6, which has been placed on the shaft of the step motor 19. The overhung position of the metering roller 6 allows a rapid and uncomplicated exchange for maintenance and/or repair purposes. The holding bracket 17 is resiliently fastened by means of bolts 27 and rubber buffers 28 on a frame 29.

The transported volume is adjusted by means of the step motor 19, in particular by its number of revolutions. The clock time is matched by means of the frequency of the step motor 19 to the clock speed of the paper sheets.

What is claimed is:

1. A device for metering powder, comprising:

a powder delivery device, and an axially symmetrical metering element arranged underneath said powder delivery device, said axially symmetrical metering element having a surface profile which defines a plurality of channel means spaced adjacent and continuous to each other in the axial direction, with each channel means extending in the circumferential direction relative to said axial direction and adapted in their spacing so that the powder is not compressed during movement in the circumferential direction about said axially symmetrical metering element.

2. The device as defined in claim 1, wherein said channel means comprise one of circumferential channels, circumferential grooves and circumferential corrugations.

3. The device as defined in claim 1, wherein said powder means are powder-friendly, such that the powder is transported so that a constant quantity of powder is realized in transport.

4. The device as defined in claim 3, wherein said surface of said axially symmetrical metering element is one of: roughened; sand blasted; etched; chromated; and electrolytically provided with a matte finish.

5. The device as defined in claim 1, further comprising:

calcium carbonate or powder is attached to the surface of said axially symmetrical metering element by gluing.

6. The device as defined in claim 1, further comprising:

a horizontally oriented rotating shaft, wherein said axially symmetrical metering element comprises one of a metering roller, a cone and a sphere, mounted on said horizontally oriented rotating shaft.

7. The device as defined in claim 1, further comprising:

a loosening device for loosening the powder from said axially symmetrical metering element, wherein said axially symmetrical metering element is provided with said loosening device.

8. The device as defined in claim 7, wherein said loosening device comprises one of a doctor blade; a brush; and a blower nozzle.

9. The device as defined in claim 1, further comprising:

a drive for said axially symmetrical metering element.

10. The device as defined in claim 9, wherein said drive comprises a step motor.

11. The device as defined in claim 9, wherein said drive is resiliently mounted.

12. The device as defined in claim 9, wherein said drive has a shaft, and wherein said axially symmetrical metering element is seated to overhang on said shaft.

13. The device as defined in claim 1, further comprising:

a housing defining an inlet opening to said axially symmetrical metering element and an outlet opening from said axially symmetrical metering element, wherein said openings are arranged more than 180° from each other in the direction of rotation of said axially symmetrical metering element.

14. The device as defined in claim 1, further comprising:

labyrinth seals, wherein a metering zone is defined and is laterally bordered by said labyrinth seals.

15. The device as defined in claim 14, further comprising:

a drain, wherein said labyrinth seals are emptied via said drain.

16. The device as defined in claim 1, wherein the assembled device for metering powder is resiliently mounted.

* * * * *